US012388190B2

(12) United States Patent
Kocourek et al.

(10) Patent No.: US 12,388,190 B2
(45) Date of Patent: Aug. 12, 2025

(54) WAVEGUIDE FOR TRANSMITTING MICROWAVE SIGNALS

(71) Applicant: Robert Bosch GmbH, Stuttgart (DE)

(72) Inventors: Vaclav Kocourek, Beilstein (DE); Armin Himmelstoss, Weissach Im Tal (DE); Martin Astner, Pleidelsheim (DE); Rico Alf Klein, Heilbronn (DE); Udo Schulz, Vaihingen/Enz (DE); Uwe Wostradowski, Weil der Stadt-Merklingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 241 days.

(21) Appl. No.: 17/938,148

(22) Filed: Oct. 5, 2022

(65) Prior Publication Data

US 2023/0111552 A1 Apr. 13, 2023

(30) Foreign Application Priority Data

Oct. 13, 2021 (DE) ..................... 10 2021 211 512.8

(51) Int. Cl.
*H01Q 21/00* (2006.01)
*H01Q 3/01* (2006.01)
*H01Q 13/06* (2006.01)

(52) U.S. Cl.
CPC ........... *H01Q 21/0043* (2013.01); *H01Q 3/01* (2013.01); *H01Q 13/06* (2013.01)

(58) Field of Classification Search
CPC ...... H01Q 3/01; H01Q 13/06; H01Q 21/0043; H01P 1/122; H01P 1/182
See application file for complete search history.

(56) References Cited

U.S. PATENT DOCUMENTS

| | | | | |
|---|---|---|---|---|
| 6,833,772 | B1 * | 12/2004 | Brown | H01P 1/10 333/108 |
| 10,944,178 | B1 * | 3/2021 | Baur | H01Q 9/16 |
| 2004/0212449 | A1 * | 10/2004 | Rawnick | H01P 1/222 333/81 B |
| 2005/0007209 | A1 * | 1/2005 | Brown | H01P 1/16 333/81 B |

* cited by examiner

*Primary Examiner* — Dameon E Levi
*Assistant Examiner* — Leah Rosenberg
(74) *Attorney, Agent, or Firm* — NORTON ROSE FULBRIGHT US LLP

(57) ABSTRACT

A waveguide in the form of a wave duct for transmitting microwave signals includes at least one non-conducting body arranged in and/or on the wave duct, and by at least one MHD pump, by which an electrically conductive liquid medium can be admitted to fill the at least one body and/or to exert a force on at least one wall of the wave duct.

19 Claims, 8 Drawing Sheets

WAVEGUIDE FOR TRANSMITTING MICROWAVE SIGNALS

CROSS REFERENCE

The present application claims the benefit under 35 U.S.C. § 119 of German Patent Application No. DE 10 2021 211 512.8 filed on Oct. 13, 2021, which is expressly incorporated herein by reference in its entirety.

FIELD

The present invention relates to a waveguide for transmitting microwave signals.

BACKGROUND INFORMATION

Waveguides, also known as horn antennas, have long been an essential part of antenna systems. These antenna systems are in particular used in radar sensors, for example in vehicles, and are constituted by phased arrays. In order to detect different driving situations and vehicle environments, a plurality of radar sensors which perform different tasks are used in a vehicle. In this case, individual radar sensors may be used only for a limited detection range, and additional radar sensors need to be used for larger detection ranges.

An object of the present invention is to provide waveguides as part of an antenna system for transmitting microwave signals that is used in particular in radar sensors in vehicles such that the emission characteristic can be adapted dynamically by the waveguides to different requirements brought about by driving situations and different environments.

SUMMARY

According to a highly advantageous aspect of the present invention, the waveguide is designed as a wave duct.

In the following, the present invention is explained on the basis of a wave duct. It should be expressly noted that this does not limit the generality of the present invention. Purely in principle, the waveguide can be designed in any manner. For example, the waveguide can act as an antenna, as explained in greater detail in the following.

The waveguide according to the present invention, which is designed as a wave duct, for transmitting microwave signals in, for example, an antenna system, in which at least one non-conducting body arranged in and/or on the wave duct and at least one magnetohydrodynamic pump (MHD pump), by which the at least one body can be filled with an electrically conductive liquid to influence the wave propagation in the waveguide, are provided, makes it possible for the emission characteristic and/or the wave transport of the waveguide and thus the antenna system, of which the waveguide designed as a wave duct is part, to be dynamically adapted to different requirements. When using a waveguide of this kind in an antenna system of a radar sensor, improved object recognition is thus possible due to an improved resolution, greater coverage, and a dynamic detection range.

The MHD pump makes it possible to rapidly switch the antenna directional diagram or even reconfigure it where necessary. By way of example, this can be used in base stations in the I 4.0 field and in the 5G infrastructure sector, for example, for more reliable mobile telecommunications coverage on roads. The MHD pump or, in other words, a magnetohydrodynamic-based actuator is used to change the emission characteristic. This magnetohydrodynamic pump or magnetohydrodynamic actuator utilizes the effect of the Lorentz force on an electrically conductive liquid medium, for example a liquid metal, to pump this liquid electrically conductive medium into the at least one body and to fill it therewith in order to influence to the cross section and thus the wave propagation in the waveguide designed as a wave duct.

In this case, according to one aspect of the present invention, the at least one body can be partially or completely filled with the electrically conductive liquid medium. This means that the body can be partially or completely filled in order to thus influence the transmission properties of the waveguide and influence the emission characteristic of the antenna system as a result. Therefore, all-pass elements and attenuation elements can also be depicted.

According to a specific example embodiment of the present invention, the decoupling from the waveguide is influenced, in particular by covering and re-opening openings, e.g., decoupling slots.

According to one aspect of the present invention, the at least one body is arranged in the waveguide to form a reflection in the waveguide.

In a further specific example embodiment of the present invention, a plurality of non-conducting bodies, which can be filled in succession by actuating the MHD pump in a targeted manner to form a moving reflection or conduction plane, are arranged in the waveguide.

In a further specific example embodiment of the present invention, the at least one body is arranged on the waveguide so as to change the cross section of the waveguide by actuating the MHD pump. By way of the MHD pump and by utilizing the effect of the Lorentz force on the electrically conductive liquid medium, a force or pressure and/or a volume change is brought about, which can influence the antenna characteristic by changing the transmission properties of the waveguide(s) in a targeted manner and can calibrate said antenna characteristic during production, for example at the end of the line. In this case, the orientation of the antenna diagram can be continuously changed or switched by the phase assignment of the antenna emission elements. It is also possible to switch different antenna parts of the antenna system.

Owing to the exertion of the force, the waveguide is elastically deformed and, associated therewith, a change in cross section takes place, such that the transmission behavior of the waveguide changes.

Particularly preferably, the waveguides designed as wave ducts are made of metal or a metallized plastics material, for example of a metallized plastics injection molding. The wave duct itself can have any cross-sectional shape, such as a rectangular, polygonal, round, or oval cross-sectional shape.

The electrically conductive liquid medium is a liquid metal, for example.

The liquid metal is preferably a liquid metal alloy, in particular a eutectic alloy of gallium, indium, and tin, which is known by the brand name Galinstan, for example.

BRIEF DESCRIPTION OF THE DRAWINGS

Exemplary embodiments of the present invention are shown in the figures and are explained in greater detail in the following description.

DETAILED DESCRIPTION OF EXAMPLE EMBODIMENTS

Figure 1:
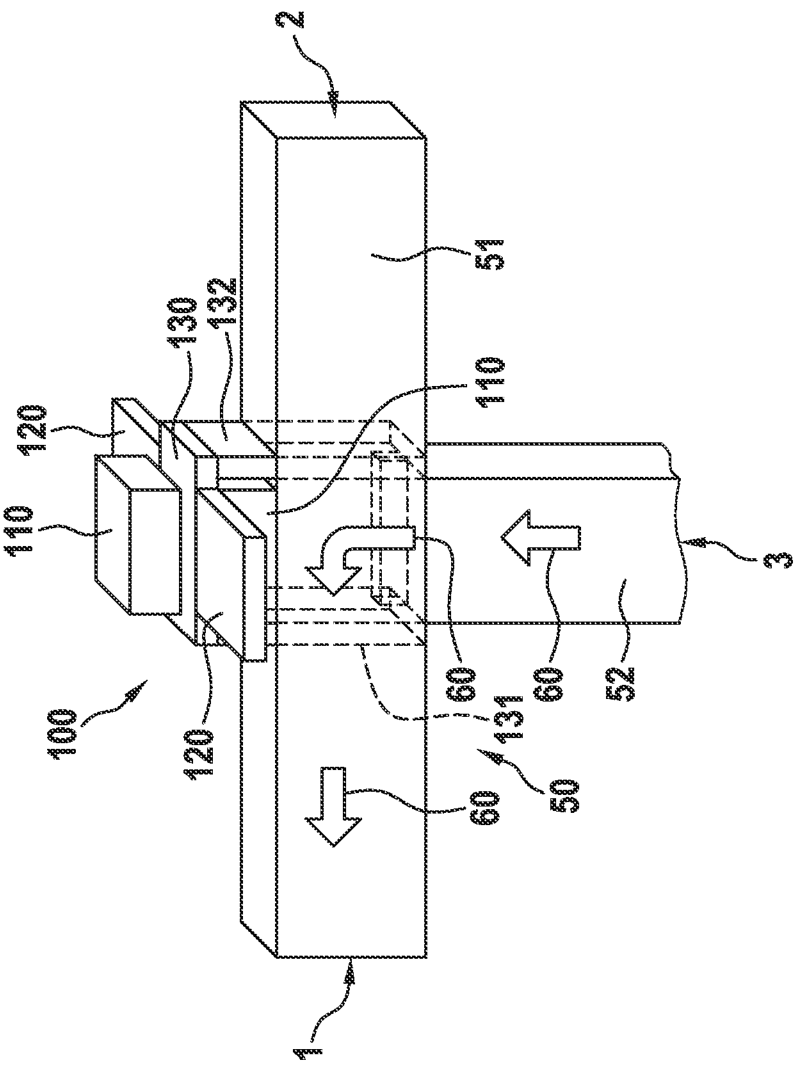
FIG. 1 schematically shows a wave duct according to an example embodiment of the present invention for transmitting microwave signals.
Figure 2:
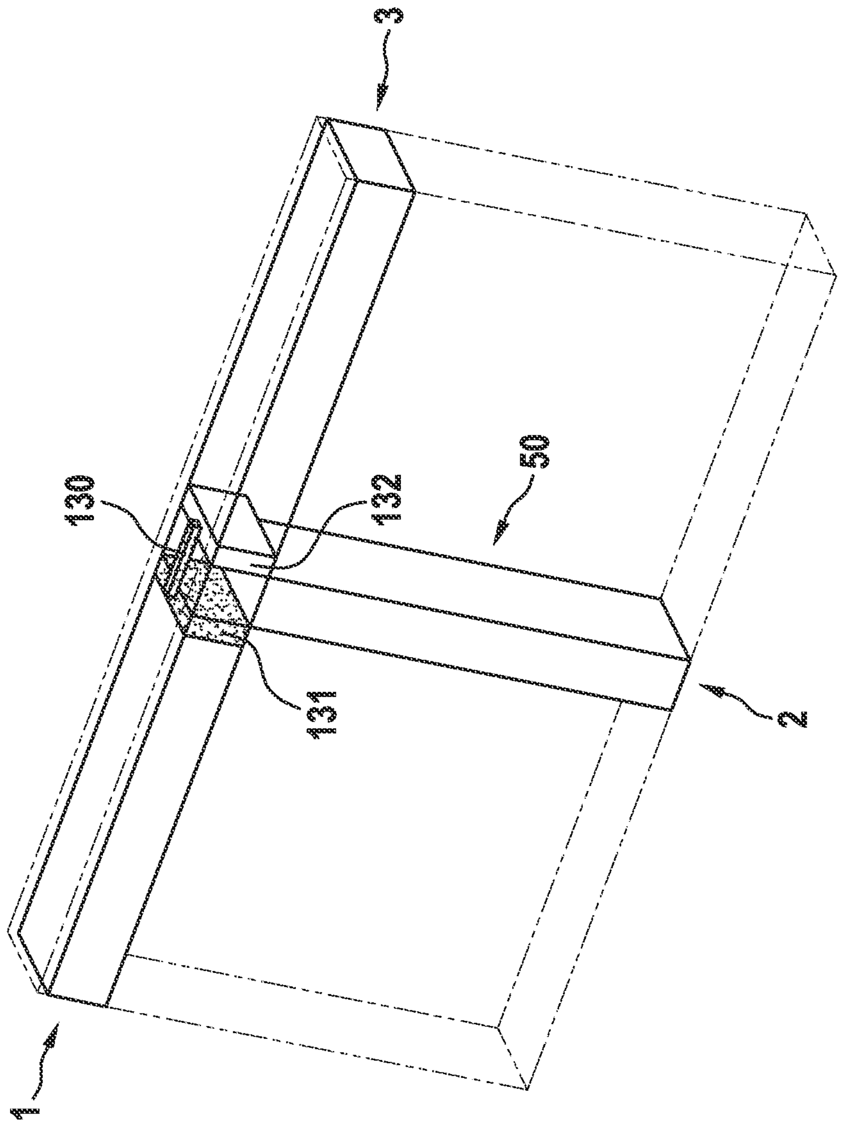
FIG. 2 is a simplified schematic view of the wave duct shown in FIG. 1 for explaining the SP2T function (double-throw switch).

A waveguide designed as a wave duct 50 for transmitting microwave signals, shown in FIG. 1, is designed as a wave duct T-piece comprising three ports 1, 2, 3, by way of example. An MHD pump 100, which acts as a waveguide/wave duct switch, is arranged at the junction of the T-piece. In further specific embodiments, gang switches can also be designed, in particular for channel multiplexing or a polarization switch in the antenna system. In a conventional manner, this MHD pump 100 comprises two permanent magnets 110 as well as two electrodes 120. A substantially U-shaped body 130, of which the U-legs designed as channels 131, 132 project into the wave duct 50, is arranged between the permanent magnets 110. The body 130 is made of a non-conducting material, for example plastics material. The wave duct 50 itself consists of metal or a metallized plastics material; it is implemented in the form of a metallized plastics injection molding, for example. The wave propagation in the wave duct 50 from the port 3 to the port 1 is shown schematically with the aid of arrows 60. If the body 131 shown on the left in FIG. 1 is not filled with an electrically conductive liquid medium, in particular liquid metal, while the body 132 shown on the right in FIG. 1 is filled with an electrically conductive liquid medium, in particular liquid metal, the waves 60 are deflected in the wave duct as shown in FIG. 1 with the aid of the arrows 60, i.e., from the port 3 to the port 1. By actuating the MHD pump, the liquid can be transferred from the right-hand body, in the form of the U-leg 132, into the left-hand body, in the form of the U-leg 131, by pumping, and a different wave propagation is produced in the wave duct in this way. FIG. 2 schematically shows this arrangement with the MHD pump omitted; in this case, the left-hand body, i.e., the left-hand U-leg 131, is filled with liquid metal, while the right-hand body, i.e., the right-hand U-leg 132, is empty.

Figure 3A:
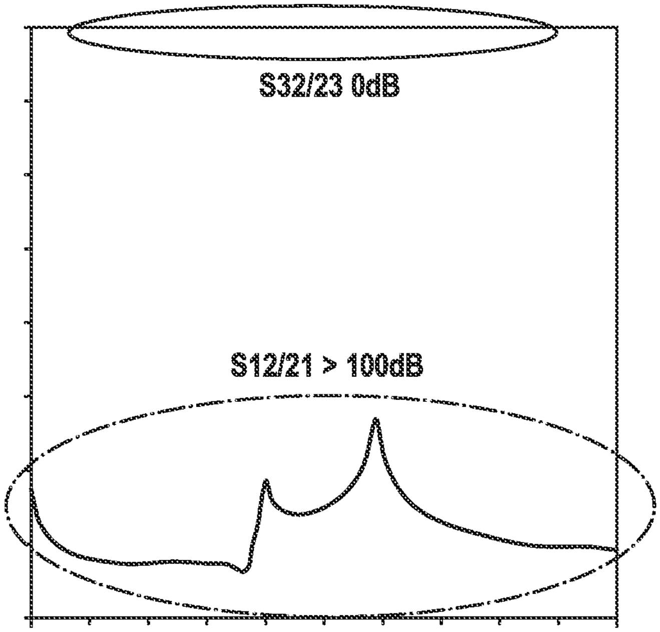
FIG. 3A shows the attenuation of all the gates among one another (S parameters).
Figure 3B:
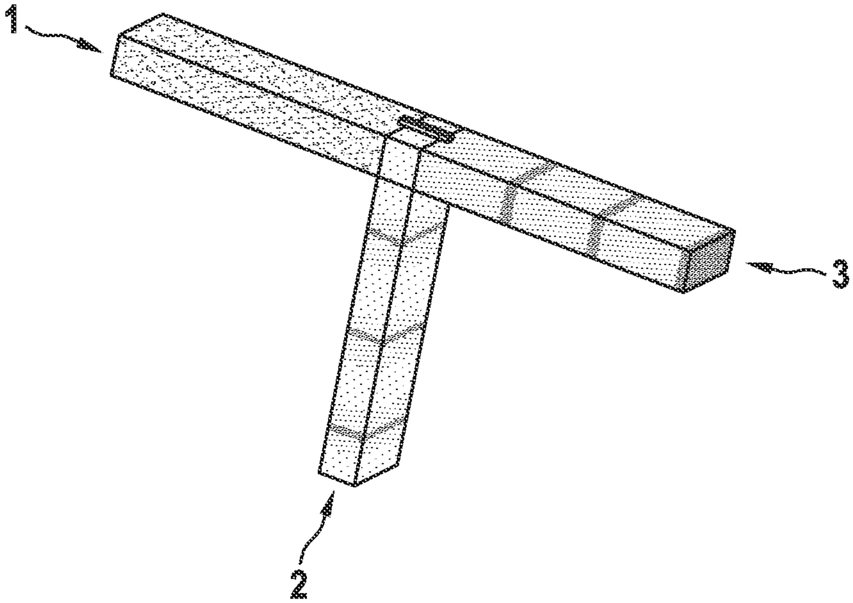
FIG. 3B schematically shows the active path between ports 2 and 3, with the EM field depicted in FIG. 3A.

FIG. 3B shows the active path between the ports 2 and 3 of the wave duct. The attenuation is schematically shown in FIG. 3A. Since this arrangement is reciprocal, S21=S12, S31=S13, and S23=S32. The frequency in the range of 70 to 80 GHz is shown on the x axis. The attenuations are shown on the y axis, on which the attenuation S32/23 is 0 dB, while the attenuation S12/21 is >100 dB.

Figure 4:
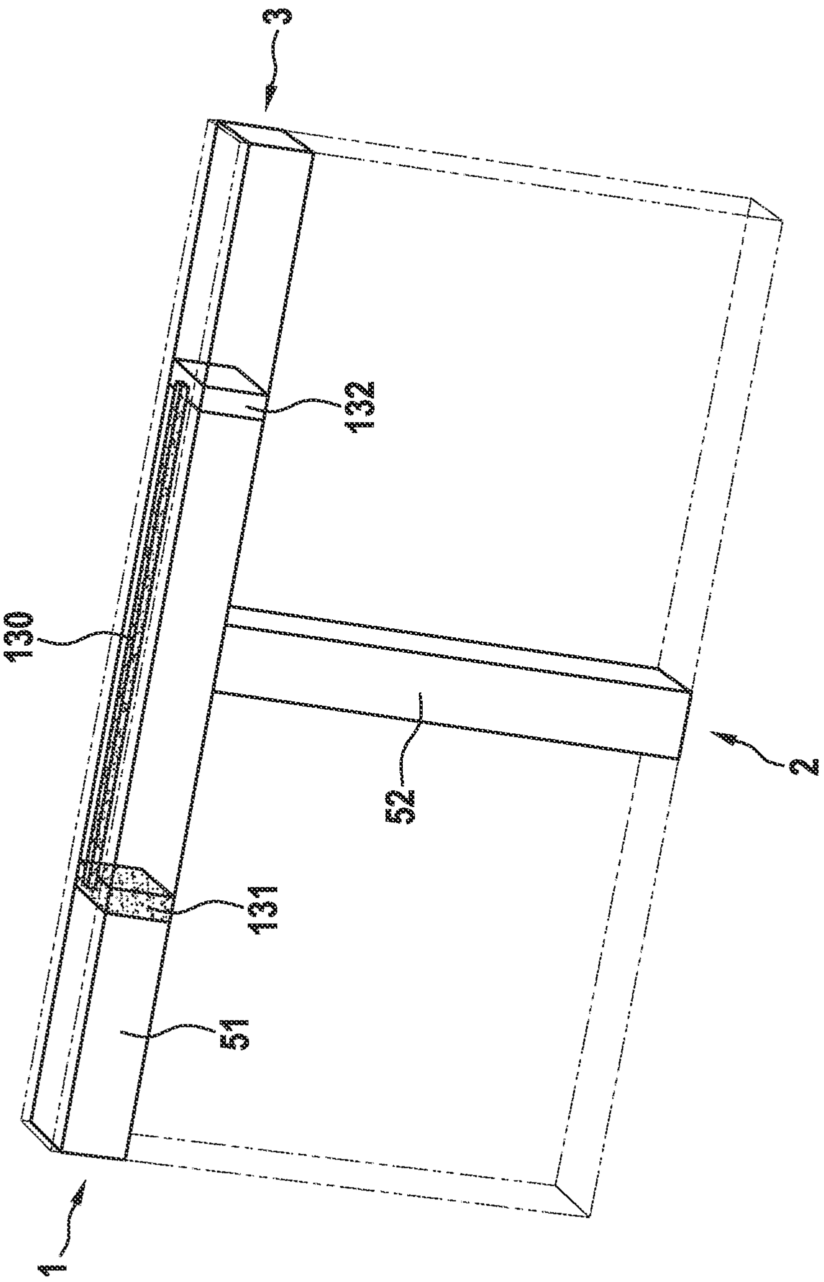
FIG. 4 schematically shows another specific example embodiment of the wave duct according to the present invention in the form of a filter/phase modifier.
Figure 5:
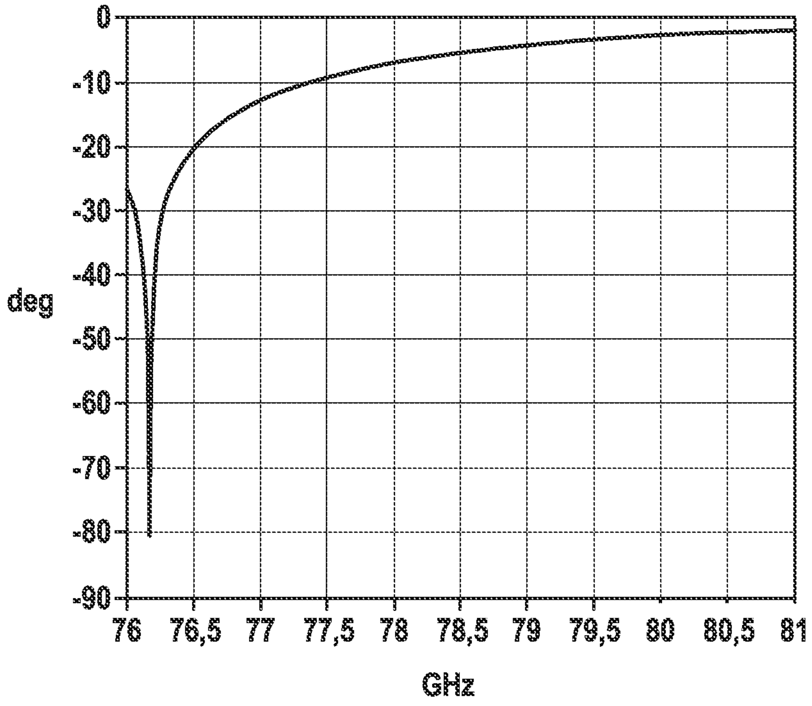
FIG. 5 shows the transmission behavior from port 3 to port 2 of the wave duct shown in FIG. 4.

By shifting the two U-legs away from the junction, filters or phase modifiers can be implemented, as shown schematically in FIG. 4. In FIG. 4, the two U-legs 131, 132 are not right at the junction at which the body 52 discharges into the body 51, but instead are a predefinable length away from this discharge point. This predefinable length can be $\lambda/4$, for example, resulting in destructive interference. In FIG. 4, the leg 131 is again filled with liquid metal, while the leg 132 is not filled. By way of shiftable short-circuit planes of this kind, a very sharp filter function can be produced, as in FIG. 5, which shows the transmission behavior from port 3 to port 2. The transmission behavior is shown over a frequency range from 75 to 81 GHz. As can be seen in this figure, at 76.2 GHz there is a sharp peak, i.e., a stop band.

Figure 6:
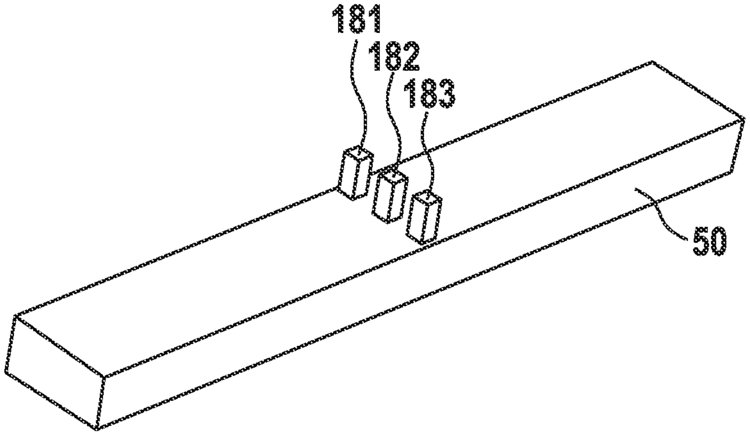
FIG. 6 schematically shows a further specific example embodiment of a wave duct according to the present invention comprising three capillaries/bodies for producing a variable phase modifier or final phase control element.

Yet another configuration of a wave duct according to the present invention for transmitting microwave signals, as shown in FIG. 6, provides three capillaries 181, 182, 183, which can be filled with liquid metal by the MHD pump, in a rectangular wave duct 180. An arrangement of this kind produces a variable phase modifier. In this case, the MHD pump functions as a final phase control element.

In another specific embodiment (not shown), a body, which can be filled with liquid metal, is arranged in parallel with the wave duct. By filling this body, the cross section of the wave duct, and therefore the emission behavior of the waveguide, is changed.

The MHD pump or the MHD actuator can also be actuated such that a pressure or a force is exerted on the wall of the wave duct; if this wall is deformable, this results in the wave duct being deformed. Deformation of this kind which causes a change in the cross section of the wave duct results in a change in the transmission behavior of the wave duct. In this case, the MHD actuator or the MHD pump can apply a force or a pressure to a wall of the wave duct or a wave duct antenna in order to thus bring about a change in the cross section of the wave duct or a desired structure of the wave duct.

Figure 7:
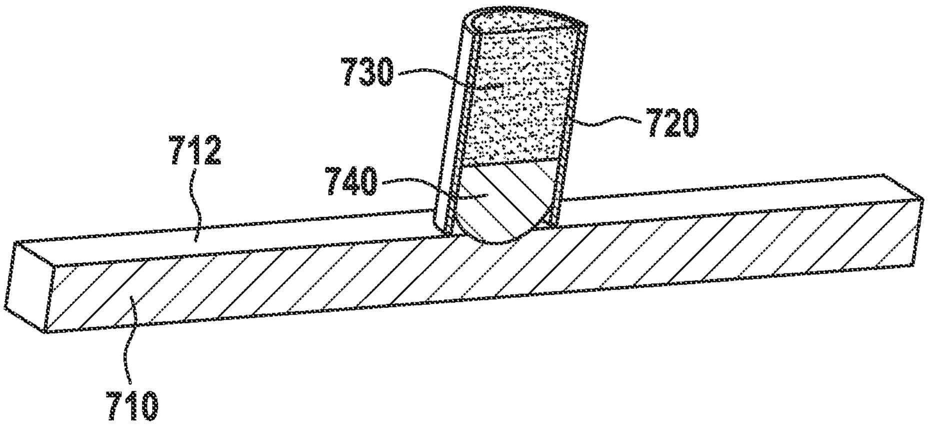
FIG. 7 schematically shows a specific example embodiment of the present invention in which a pressure is exerted on a wave duct wall.
Figure 8:
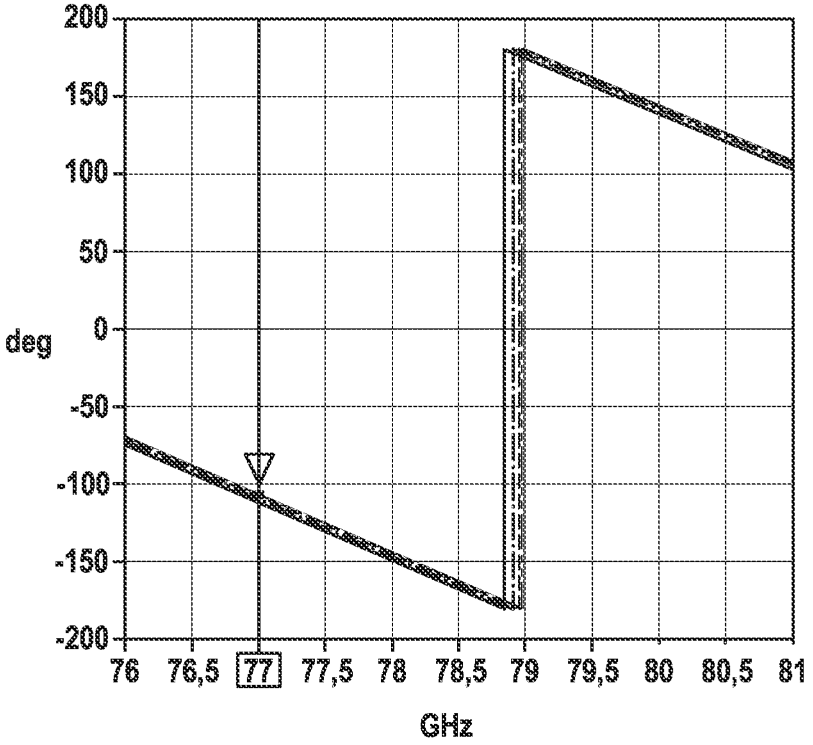
FIG. 8 schematically shows the phase variation over the frequency.

One exemplary embodiment of this is shown in section in FIG. 7. On one of its walls, a rectangular wave duct 710 comprises a pipe 720, which is filled with an electrically conductive liquid medium 730 and is blanked off at the end by an electrically non-conducting hemisphere 740. This hemisphere presses on the wall 712 of the wave duct 710 facing the pipe 720. Depending on the exertion of the pressure exerted by this MHD pump (not shown), the wall 712 is deformed. This results in a phase shift in the transmission behavior owing to the hemisphere 740 being impressed by the MHD pump, as indicated on the basis of the S parameters shown in FIG. 8, which represent the phases in degrees over the frequency.

Figure 9:
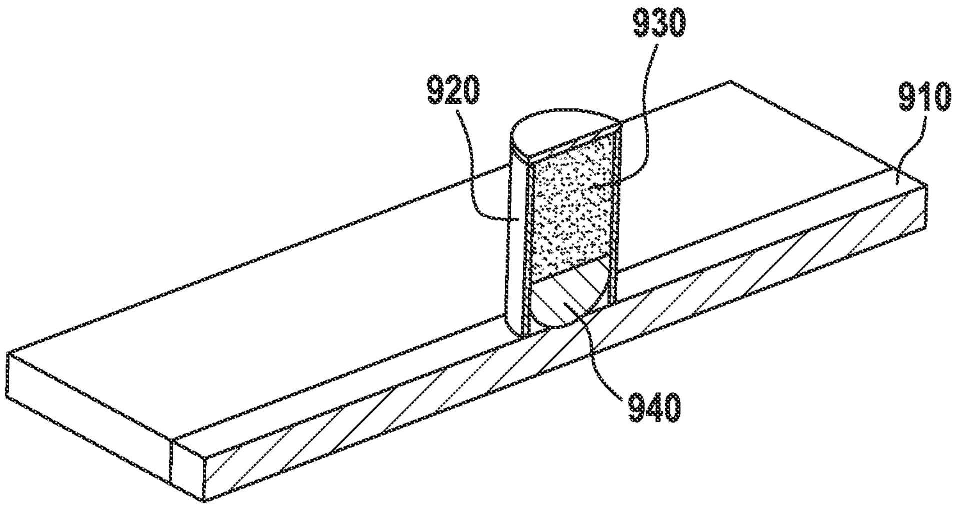
FIG. 9 shows another specific example embodiment of the present invention in which the pressure is exerted on a microstrip.

Another specific embodiment is shown in FIG. 9, which shows a microstrip 910 on which a pipe 920 is arranged again, which is filled with an electrically conductive liquid medium 930 and is blanked off at its end facing the microstrip 910 by an electrically non-conducting hemisphere 940. In this case, too, the hemisphere 940 is pressed against the microstrip 910 by pressure being applied by the MHD pump.

Figure 10:
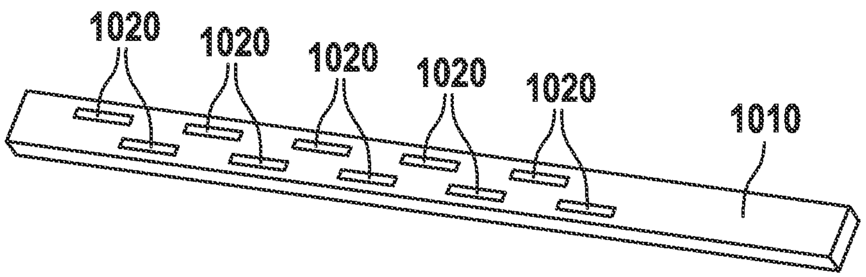
FIG. 10 shows a wave duct comprising slot-shaped openings, according to an example embodiment of the present invention.
Figure 11:
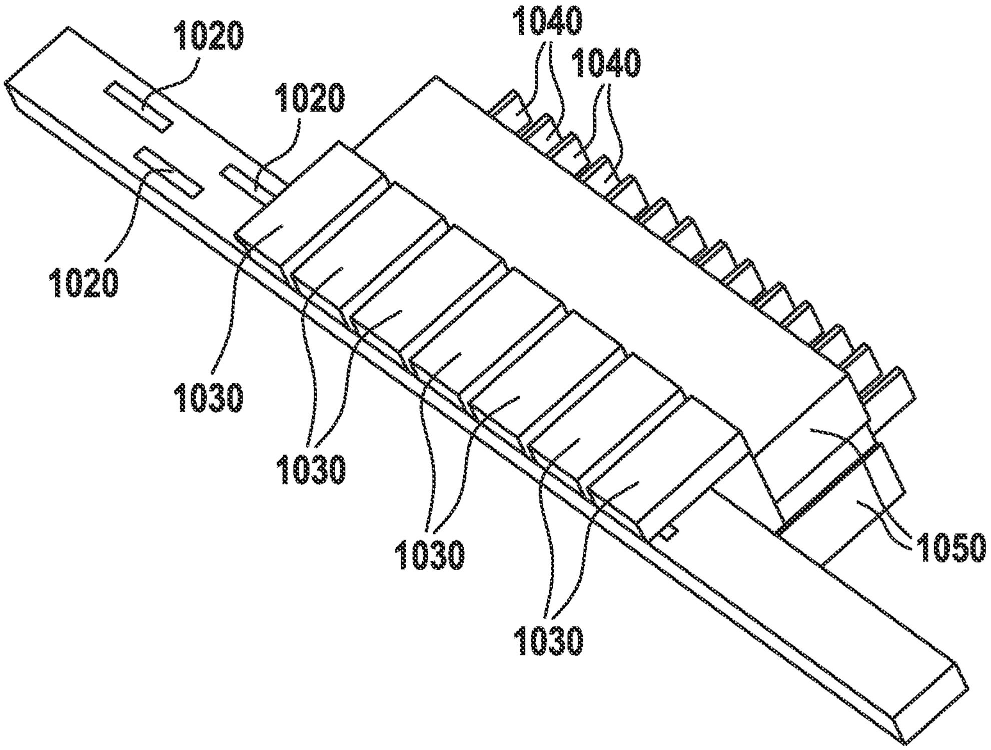
FIG. 11 shows the wave duct shown in FIG. 10 and schematically shows an assembly configured to close and open the slots by way of an electrically conductive liquid medium with the aid of an MHD pump.

According to a specific embodiment shown in FIGS. 10 and 11, the decoupling from the waveguide is influenced, in particular by covering and re-opening openings, e.g., decoupling slots. With the MHD pump omitted, FIG. 10 schematically shows a wave duct 1010, which comprises rectangular slots 1020. As shown schematically in FIG. 11, these slots can be closed and opened by an electrically conductive liquid medium 1030, which is shown in FIG. 11 without the surrounding guides made of an electrical insulator and without reservoirs and cavities, the electrically conductive liquid metal being actuated by gate electrodes 1040 and permanent magnets or coil packages 1050. This results in a multi-channel, independently actuable configuration of which the emission behavior is adjustable.

What is claimed is:

1. A waveguide arrangement for microwave signals, the waveguide arrangement comprising:

a waveguide structured with one or more wave passages for transmission of the microwave signals over the one or more wave passages;

at least one non-conducting body over which the microwave signals are not transmitted and that is arranged near the one or more passages of the waveguide; and at least one magnetohydrodynamic (MHD) pump, by which a fill of the at least one non-conducting body with an electrically conductive liquid medium is dynamically modifiable to thereby control a change in at least one of an attenuation, a phase, and a reflection of the microwave signals that are in the one or more passages of the waveguide.

2. The waveguide arrangement as recited in claim 1, wherein the at least one non-conducting body is partially or completely fillable with the liquid metal using the MHD pump.

3. The waveguide arrangement as recited in claim 1, wherein the waveguide is a wave duct.

4. The waveguide arrangement as recited in claim 3, wherein the at least one non-conducting body is arranged in the wave duct to form a plane of reflection.

5. The waveguide arrangement as recited in claim 4, wherein the at least one non-conducting body includes shiftable, non-conducting bodies arranged in the wave duct.

6. The waveguide arrangement as recited in claim 3, wherein the at least one non-conducting body is arranged on at least one wave duct wall.

7. A waveguide arrangement for transmitting microwave signals, the waveguide arrangement comprising:

a wave duct;

at least one non-conducting body arranged on at least one wall of the wave duct; and at least one MHD pump by which an electrically conductive liquid medium can be admitted to fill the at least one non-conducting body and/or to exert a force on at least one wall of the wave duct;

wherein at least one slot in the wave duct can be closed and opened by the at least one non-conducting body to influence a coupling state of the wave duct.

8. The waveguide arrangement as recited in claim 3, wherein the MHD pump and a volume filled with the electrically conductive liquid medium are arranged on a wall of the wave duct such that, by actuating the MHD pump, a pressure element exerts a pressure on the wave duct wall.

9. The waveguide arrangement as recited in claim 1, wherein the waveguide is made of a metal or a metallized plastics material.

10. The waveguide arrangement as recited in claim 1, wherein the waveguide has a rectangular or polygonal or round or oval, cross-sectional shape.

11. The waveguide arrangement as recited in claim 1, wherein the electrically conductive liquid is a liquid metal.

12. The waveguide arrangement as recited in claim 11, wherein the liquid metal is a eutectic alloy of gallium, indium, and tin.

13. The waveguide arrangement as recited in claim 1, wherein the waveguide is configured to act as an antenna.

14. The waveguide arrangement as recited in claim 7, wherein the at least one non-conducting body is partially or completely fillable with the liquid metal using the MHD pump.

15. The waveguide arrangement as recited in claim 7, wherein the waveguide is made of a metal or a metallized plastics material.

16. The waveguide arrangement as recited in claim 7, wherein the waveguide has a rectangular or polygonal or round or oval, cross-sectional shape.

17. The waveguide arrangement as recited in claim 7, wherein the electrically conductive liquid is a liquid metal.

18. The waveguide arrangement as recited in claim 17, wherein the liquid metal is a eutectic alloy of gallium, indium, and tin.

19. The waveguide arrangement as recited in claim 7, wherein the waveguide is configured to act as an antenna.

* * * * *